Figure 1:
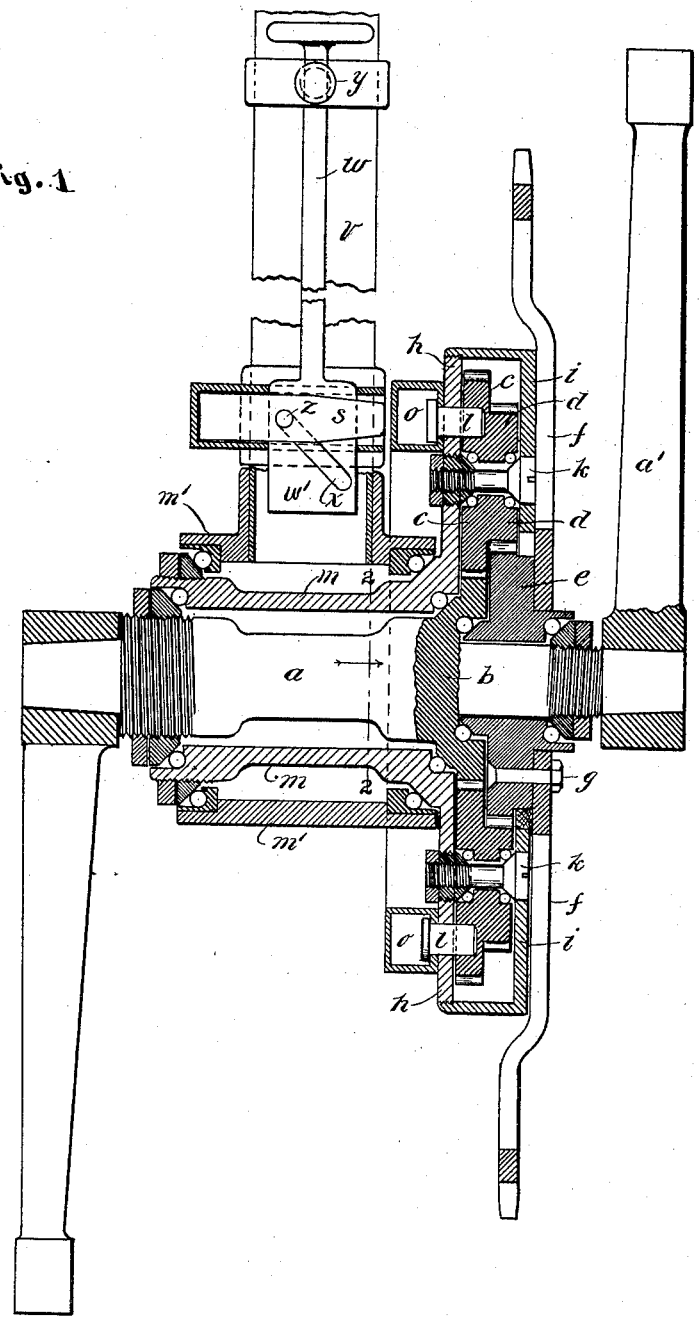

No. 660,547. Patented Oct. 23, 1900.
H. DYER.
COMPOUND BICYCLE GEAR.
(Application filed Oct. 14, 1899.)
(No Model.) 2 Sheets—Sheet 2.
Fig. 2
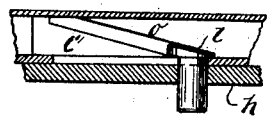
Fig. 3
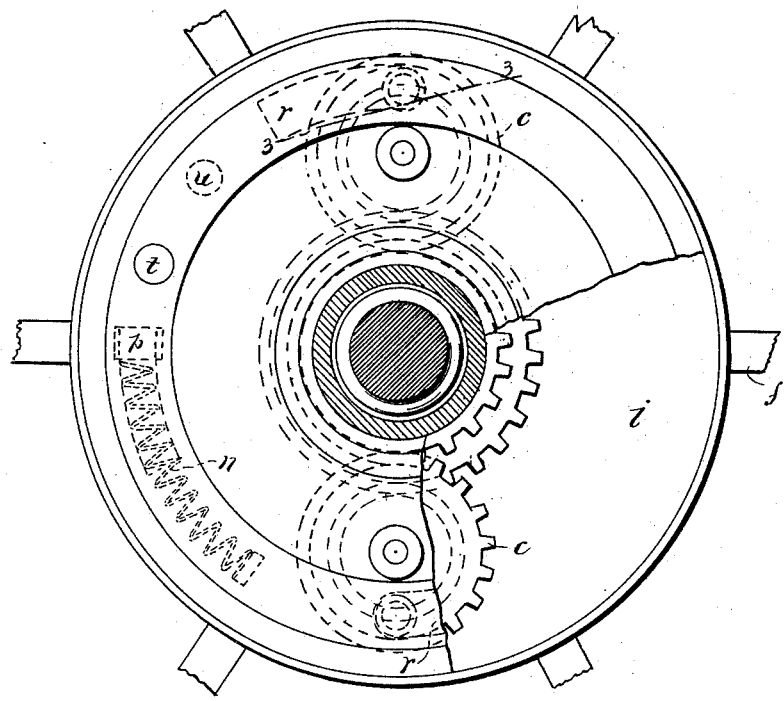
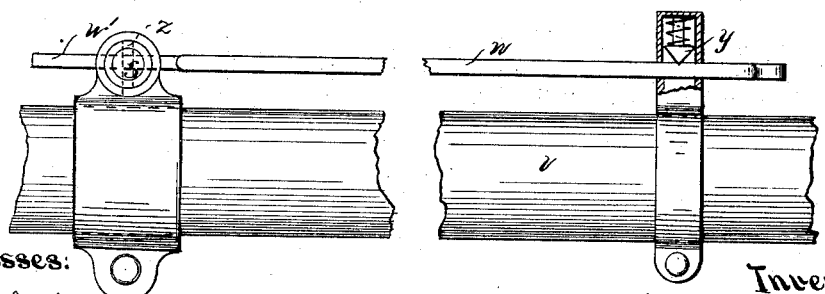
Fig. 4
Witnesses:
G. S. Noble
W. S. Swiney
Inventor,
Henry Dyer
By H C Hunsberger
Att'y.
THE NORRIS PETERS CO., PHOTO-LITHO., WASHINGTON, D. C.

UNITED STATES PATENT OFFICE.

HENRY DYER, OF CHICAGO, ILLINOIS.

COMPOUND BICYCLE-GEAR.

SPECIFICATION forming part of Letters Patent No. 660,547, dated October 23, 1900.

Application filed October 14, 1899. Serial No. 733,665. (No model.)

*To all whom it may concern:*

Be it known that I, HENRY DYER, a citizen of the United States, residing at Chicago, county of Cook, and State of Illinois, have invented a new and useful Improvement in Compound Bicycle-Gear, of which the following is a specification.

The objects of my invention are to provide a driving-gear by which the speed may be controlled, increased, or reduced and by means of a plurality of gear-wheels which may be operated in conjunction with the driving sprocket-wheel to control or check its speed and at the option of the rider to use either or both methods, as the occasion may require. Its efficacy is more apparent in the ascent or descent of steep inclines. In the ascent it adds to the power of the driving-shaft and in the descent the rider has a more complete control of the driving-sprocket to check its speed, if he desires, and thereby a better command of his wheel.

The device is illustrated in the accompanying drawings, in which—

Figure 1 is an enlarged horizontal sectional view through the driving-shaft. Fig. 2 is a view taken on line 2 2, Fig. 1, with a portion broken away. Fig. 3 is a sectional view on line 3 3, Fig. 2, showing locking-pin and means of operation. Fig. 4 is a side view of the shifting-bar and attached to the down-tube of the frame.

The letter $a$ represents the driving-shaft.

$b$ is a gear-wheel rigidly secured to shaft $a$.

$c$ is a similar gear engaging with $b$. $d$ is a smaller gear and secured to the gear $c$ on the same shaft. $e$ is a gear-wheel also on the shaft $a$.

$f$ is the driving sprocket-wheel, secured to the gear $e$, and $g$ bolts securing the gear $e$ to the driving-sprocket.

$h$ is the inner disk.

$i$ is the outer disk and bolted to the disk $h$, inclosing the above gear-wheels.

$k$ $k$ are shafts for the gears $c$ $d$.

$l$ is a pin adapted to engage and lock gear $c$.

$m$ is a sleeve on shaft $a$ and integral with or secured to disk $h$.

$o$ is a ring projecting from the face of the disk $h$. $p$ $p$ are bolts on said disk within the ring $o$. (One only shown.) $n$ $n$ are spiral springs laid longitudinally in ring $o$, which engage with said bolts $p$ $p$.

$r$ $r$ are slots in the under surface of ring $o$.

$s$ is a pin operated by a rod from the seat.

$t$ is a hole in the ring $o$, in which the pin $s$ engages.

$u$ is a hole in disk $h$.

$v$ is the down-tube of the frame. $w$ is a rod extending up said down-tube to the saddle. $w'$ is a plate on the end of said rod which passes through pin $s$. $x$ is an inclined slot in said plate $w'$.

$y$ is a spring-catch to hold the rod $w$ in its place.

$z$ is a stud transversely through pin $s$, which engages in the slot $x$.

In the construction of my device I utilize the driving-sprocket, the driven sprocket, and chain, as in the ordinary safety-bicycle, to which I add the system of gears on the driving-shaft, in conjunction with the driving-sprocket. A driving-shaft $a$ carries on the end adjacent the driving-sprocket $f$ a spur-gear $e$, and I secure them together by the bolts $g$, both wheels loose on the shaft $a$ and provided with ball or antifriction bearings. The driving-shaft $a$ also carries integrally a second spur-gear $b$, adjacent the spur-gear $e$ and adapted to engage with spur-gears $c$ on shaft $k$. A pinion $d$ on the shaft $k$ is secured to or integral with spur-gear $c$ and partakes of its motion. The pinion $d$ engages with the spur-gear $e$ on the driving-shaft $a$, and which transmits its motion to the driving-sprocket $f$. A sleeve $m$ within the crank-hanger $m'$ on the driving-shaft $a$ is provided at the end adjacent the spur-gear $b$ with an annular flanged extension or projection $h$, which I have designated as disk $h$, which provides the bearings for the inner ends of the shafts $k$, which carry the spur-gears $c$ and pinions $d$. A disk $i$ on the end of the driving-shaft $a$ adjoining the inner side of the driving-sprocket is secured to the disk $h$ and provides the bearings for the outer end of the shaft $k$. The edges of the disks are closed, making a case neatly inclosing the gears and adapted to revolve on the driving-shaft $a$ with the sleeve $m$ and driving-sprocket $f$.

On the inner face of the disk $h$ projects at right angles a ring $o$, which has a short sliding rotary movement against the face of the disk $h$. The ring $o$ carries internally two spiral springs $n$, laid horizontally one at each half segment or pole of the ring, which engage with the posts or bolts $p$, set on the face of the inner disk $h$ and within the ring $o$, which has an open space underneath to permit a short rotary movement on the face of the disk. In the face of the ring is a hole $t$, and in the under surface of the ring are slots $r$. A pin $l$, having a flat head, is adapted to be normally in engagement with a hole in the spur-gear $c$ through the slot $r$ and a hole in the face of the disk $h$. Two opposing wedge-shaped members $l'$ are integral with or attached to the inner part of the ring $o$, one member at the sides of, the other over, the slot $r$, which engage the flat head of the pin $l$, which slides up the incline by the movement of the ring, withdrawing the pin from the spur-gear $c$, and returns to its normal engagement when the ring reverses its movement.

On the side of the down-tube $v$ is mounted a rod $w$, its upper free end provided with a handle and is held in its place by means of a spring-catch $y$, attached to a collar on the down-tube. The lower end of the rod $w$ terminates in a flat blade $w'$, having a slot $x$ diagonally through it. A pin $s$ is mounted horizontally on the lower portion of the down-tube $v$ on a plane with the ring $o$, having a slot through which passes the flat blade $w'$, the slot $x$ in the blade engaging with a stud inserted transversely through the pin and slots. The movement of the rod $w$ upward causes the pin $s$ to move forward into the holes $t$ and $u$ in the ring $o$ and disk $h$, respectively, to lock the disks $h$ and $i$ to the down-tube $v$. When the pin $s$ is moved outward, it engages the hole $t$ in the ring $o$, checking its movement, and the spiral springs $n$ permit it to yield until the pin $s$ engages also in the hole $u$ in the disk $h$. This movement of the ring $o$ releases the pin $l$ from its normal engagement with the spur-gear $c$, locking the disks $h$ and $i$ to the down-tube $v$. This causes the driving-sprocket $f$ to be operated through the intervention of the gears $b$, $c$, $d$, and $e$. Releasing the pin $s$, the spiral springs $n$ restore the ring $o$ to its normal position on the disk $h$, the pin $l$ seeks its engagement with the spur-gear $c$, the gears $b$, $c$, $d$, and $e$ are locked, and the disks $h$ and $i$ are locked with the driving-sprocket $f$ and revolve with it as if there were no intervening gears.

Having thus described my invention, what I claim as new, and desire to secure by Letters Patent, is—

1. In a bicycle driving-gear, a driving-shaft, a driving and a driven sprocket-wheel, a sleeve on said driving-shaft, two facing disks integral with or secured to the end of said sleeve, two parallel shafts having bearings in said facing disks, a spur gear and pinion locked together on each of said shafts, a spur-gear on said driving-shaft and integral therewith, a spur-gear loose on said driving-shaft adjacent said driving-sprocket and secured thereto, said spur-gears on the driving-shaft adapted to engage the spur gears and pinions on said parallel shafts, a ring projecting from the face of the inner disk and having a limited rotary movement, posts on said inner disk within said ring, spiral springs horizontally in said ring to engage with said posts, said ring being provided with a hole and said disk having a similar hole adapted by the movement of said ring to come in line with each other, a slot at opposite poles in the under surface of said ring, a perforation in said disk under and in line with said slot in said ring, a pin having a flat head in said slot to engage with a hole in the spur-gear on said parallel shafts through said perforation in said disk, a wedge-shaped member on the under inner surface of said ring, a similar opposing wedge-shaped member on the upper inner surface of said ring adapted to engage the flat head of said pin, a down-tube of the frame, a pin mounted horizontally on the lower end of said tube on a plane with said ring adapted to engage in the hole in said ring and disk to lock said disk to the down-tube, means for operating said pin from the seat of the bicycle, substantially as described.

2. In a bicycle driving-gear the combination with a driving and a driven sprocket-wheel, of a driving-shaft, a spur-gear integral with or secured to said driving-shaft, a spur-gear loose on said driving-shaft and locked with said driving sprocket-wheel, a crank-hanger, a sleeve within said crank-hanger on said driving-shaft, two facing disks on the end of said sleeve, two shafts having bearings in said disks parallel with the driving-shaft, a spur gear and pinion on each of said parallel shafts, a ring projecting from the face of one of said disks having a limited rotary movement, posts on said disk and within said ring, spiral springs horizontally in said ring engaging said posts, slots in the under surface of said ring, a perforation in said disk underneath said ring and in line with said slots, a pin having a flat head in said slots adapted to engage normally in a hole in the spur-gear on the said parallel shafts through the perforation in said disk, said ring being provided with a hole and said disk having a similar hole adapted by the movement of said ring to come into alinement, a down-tube of the frame, a rod mounted vertically on said down-tube provided with a blade at its lower end, a slot diagonally in said blade, a pin mounted horizontally on the lower portion of said down-tube on a plane with said ring, a slot in said pin, a stud transversely through said slot adapted to engage the slot in the blade on said rod to move said pin outward by the upward movement of said rod.

In testimony whereof I affix my signature in presence of two witnesses.

HENRY DYER.

Witnesses:
H. C. HUNSBERGER,
W. S. SWINEY.